March 31, 1936.   H. W. SCHULZE   2,035,767
ELECTRIC OVEN
Filed Aug. 11, 1934
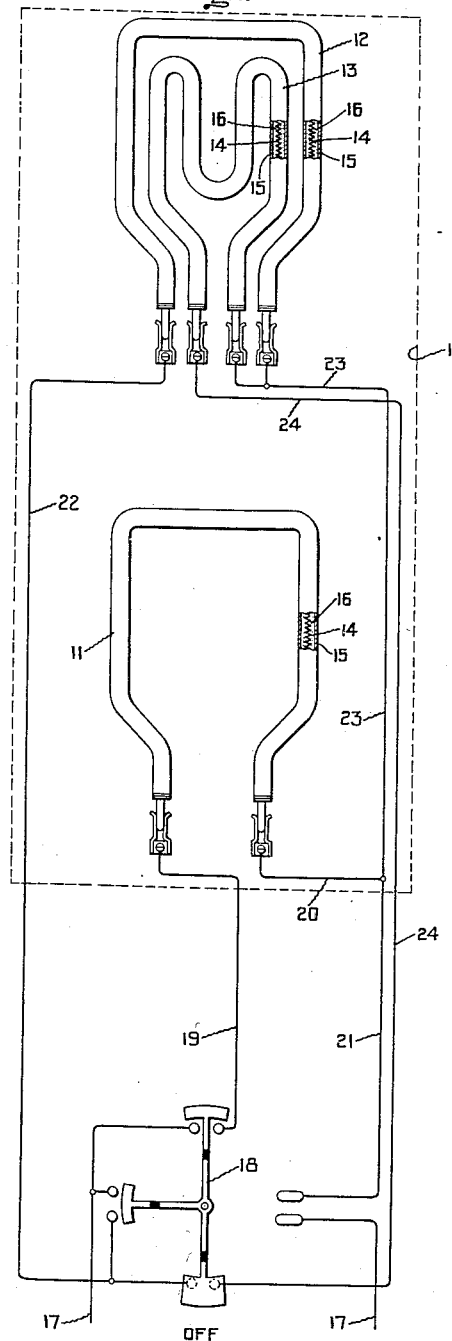
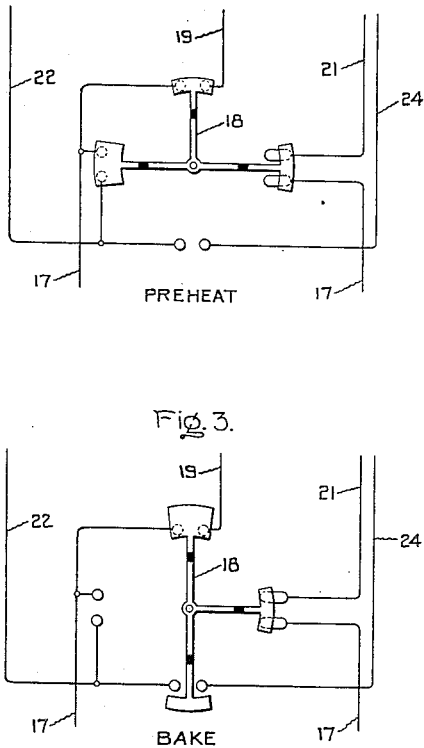
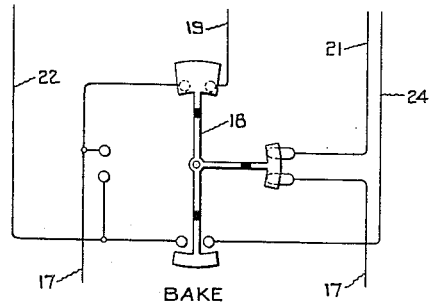
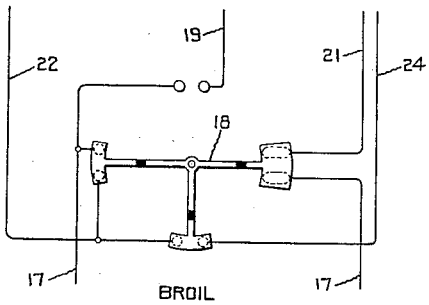
Inventor:
Herman W. Schulze,
by Harry E. Dunham
His Attorney.

Patented Mar. 31, 1936

2,035,767

UNITED STATES PATENT OFFICE 2,035,767

ELECTRIC OVEN

Herman W. Schulze, Elmwood Park, Ill., assignor to Edison General Electric Appliance Company, Chicago, Ill., a corporation of New York Application August 11, 1934, Serial No. 739,451

3 Claims. (Cl. 219—20)

This invention relates to electric ovens, more particularly to electric baking and broiling ovens, and it has for its object the provision of an improved arrangement of heating elements and control for them, whereby a simplified control is obtained for rapidly preheating the oven to a suitable normal or baking temperature, to maintain the baking temperature, and to obtain a relatively high temperature where it is available for efficient broiling operations.

Heretofore in certain instances, electric ovens have been provided with two heating elements, one in the lower portion of the oven arranged to maintain a normal or baking temperature, and a second in the upper portion of the oven provided for broiling purposes, and further, both elements being arranged to be connected in parallel for preheating the oven. The upper element only is used for broiling purposes.

It is desirable that the total wattage input to the two elements be restricted to as low a value as possible to accomplish the desired cooking results. An increase in connected load of the oven results in, higher wiring cost, poorer load factor and greater hazard of overheating.

In view of the fact that the capacity of the lower element must be sufficiently large to maintain a baking temperature in the oven, and it is desirable that the total connected load be restricted as mentioned above, the wattage input of the broiling element necessarily is limited, generally to substantially the same heat generating capacity as the lower element for the usual or the ordinary sized baking or broiling oven. The wattage input to the broiling element is, therefore, somewhat lower than desirable and because of this, the broiling results are not so satisfactory or as speedily accomplished as if a greater concentration of heat were available.

This invention contemplates the provision of an improved arrangement of heating means, and means for controlling the heating means, whereby, without increasing the total connected load on the oven, the wattage input to the heating means for broiling is substantially increased over the above described arrangement.

In accordance with this invention, the oven is provided with three heating elements, the capacity of any two of the elements substantially equaling the total desirable load of the oven. One of these elements is positioned in the lower portion of the oven and has a heating capacity sufficient to maintain a baking temperature, while the remaining two elements are positioned in the upper portion of the oven for the purpose of effecting broiling operations. In order to rapidly preheat the oven, the lower unit is connected in parallel with one of the upper units, while the lower unit only is connected to the supply source in order to maintain a baking temperature. When it is desired to broil, the two upper elements are connected in parallel to the supply source. By reason of this arrangement a relatively high concentration of heat required for efficient broiling is obtained without increasing the connected load of the oven.

For a more complete understanding of this invention, reference should be had to the accompanying drawing in which Fig. 1 is a diagrammatic view of an electric oven embodying this invention; and Figs. 2, 3, and 4 are diagrammatic views showing the various electrical connections for the heating elements provided for the oven of Fig. 1.

Referring to the drawing, this invention has been shown in one form as applied to an electric oven 10, the oven having any well-known form and shape, such for example as those provided on electric ranges for broiling and baking.

In one form of this invention, the oven is provided with an electric heating unit 11 arranged in the lower portion of the oven, and two electric heating units 12 and 13 arranged in the upper portion of the oven. These latter units are located so as to effect a broiling action on edibles properly placed within the oven. The lower heating element 11 is located within the oven in such position, and has a heat generating capacity sufficient to maintain a normal or baking temperature within the oven.

The heating elements 11, 12, and 13, as shown, are of the sheathed type, such as described and claimed in the United States Patent to C. C. Abbott No. 1,367,341, dated February 1, 1921. Briefly each element comprises a helical resistance heating element 14 which is encased by a metallic sheath 15 and which is embedded in and supported in spaced relation with reference to the sheath by means of a suitable heat refractory electrically insulating material 16, such as powdered magnesium oxide. It is to be understood, however, that these heating elements need not be of the sheathed type, but may be of the well-known open coil resistor type, or other suitable type.

The heating elements are provided with a suitable source of electrical supply 17.

As pointed out above, the heat generating capacity of the lower element 11 is such that it will maintain a suitable baking temperature within the oven. This temperature is usually determined by the setting of a suitable temperature control device for the oven (not shown). For the baking and broiling oven of usual size, the element 11 will have a capacity of approximately 1500 watts. In order to rapidly preheat the oven, it is contemplated that the heating element 11 will be connected in parallel with one of the upper heating elements, such as the element 12, to apply a distributed heat to the upper and lower portions of the oven; and that their combined capacities will be sufficient to rapidly preheat the oven to the baking temperature. In the specific form of this invention shown, the upper heating element 12 has substantially the same heat generating capacity as has the lower element 11, that is, a capacity of approximately 1500 watts. It is further contemplated that the remaining upper heating element 13 will have such a capacity that when it is connected in parallel with the other upper heating element 12, the two elements will provide the relatively high concentration of heat in the upper portion of the oven required for efficient broiling. In the specific form of the invention illustrated, the element 13 also has a heat generating capacity of 1500 watts.

The sizes of the heating elements will, of course, vary with the size and character of the oven, but for a well insulated broiling and baking oven of the normal size it is contemplated that the lower heating element 11 will have a heat generating capacity of approximately 1500 watts, and that each of the elements 12 and 13 in the upper portion of the oven will have a similar capacity.

It will be observed in the specific form of the invention illustrated that when the lower element 11 is connected to the supply source 17 for baking, the total connected load of the oven will be 1500 watts, and that when this element is connected in parallel with the upper element 12 for quick preheating to the baking temperature, the total connected load on the oven will be 3000 watts. Furthermore, it will be observed that the relatively high wattage input for broiling will be obtained by connecting the two heating elements 12 and 13 in parallel and will be effected without increasing the total load that is imposed upon the oven during the preheat period. That is, the total broiling load will be 3000 watts.

In broiling ovens heretofore generally used wherein only one upper heating unit is provided, the wattage input to the broiling element necessarily is considerably lower than that obtained in this invention, because the wattage input available is considerably less than that which is available in this invention. It is to be noted that if the single upper heating unit of the previous broiling and baking ovens was made sufficiently large in wattage input to accomplish the same heat concentration for efficient broiling as in this invention, then when it is connected in parallel with the lower heating element for quick preheating, the load imposed on the supply system will be materially in excess of 3000 watts.

The heating elements are controlled by means of a single multiple position manually operable control switch 18. This switch may have any suitable construction, and is shown quite diagrammatically in the drawing. The switch 18 has four controlling positions, an "Off" position shown in Fig. 1, a "Preheat" position shown in Fig. 2, a "Bake" position shown in Fig. 3 and a "Broil" position shown in Fig. 4. As shown in Fig. 1, the left hand terminal of the lower element 11 is connected with the switch 18 by means of a conductor 19, while the right hand terminal is connected with the switch by means of conductors 20 and 21. The left hand terminal of the upper heating element 12 is electrically connected to the switch by means of a conductor 22 and the right hand terminal is electrically connected to the switch by means of a conductor 23 and the conductor 21. The left hand terminal of the upper heating element 13 is connected with the switch by means of a conductor 24, while its right hand terminal is connected with the switch by means of the conductors 23 and 21.

Referring to Figs. 1–4 inclusive, it will be observed that when the switch 18 is in its "Off" position, all of the elements 11, 12, 13 are deenergized. In order to preheat the oven rapidly to a baking temperature, such as 400° F. for example, the switch is moved to its controling position shown in Fig. 2—the "Preheat" position of the switch. In this position of the switch, it will be observed that the heating unit 11 will be connected to the two conductors of the electrical supply source 17, and that the upper heating element 12 will be connected to the supply source in parallel with the lower heating element 11. In this position of the switch, therefore, the energy input of three thousand watts will be applied to the upper and lower portions of the oven for quick preheating. When the oven has been heated substantially to its baking temperature of 400° F. for example, the switch will be operated to its "Bake" position shown in Fig. 3, wherein the lower heating element 11 alone will be connected to the supply source 17. This operation of the switch cuts down the wattage input to 1500 watts which is applied to the lower portion of the oven for maintaining the baking or normal temperature. If it be desired to broil, the switch is thrown to its "Broil" position shown in Fig. 4 wherein the two upper heating elements 12 and 13 are electrically connected in parallel to the supply source 17. The energy input to the upper portion of the oven is, therefore, 3000 watts. This will provide the necessary high temperature at the upper element for efficient broiling.

It will be observed that this invention provides a very simple and efficient control for an electric baking and broiling oven wherein the total load is limited, and yet, wherein a high temperature broiling unit is provided in the upper portion of the oven, the wattage input for broiling being materially in excess of that of the baking and broiling ovens heretofore generally used. Furthermore, it will be observed that the heating elements are arranged and controlled for rapid preheating, while one element alone is controlled for maintaining the baking or normal operating temperature.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In an electrically heated oven, a source of electrical supply for said oven, a pair of electric heating elements in the upper portion of said oven having a combined heat generating capacity to maintain a broiling temperature in the upper portion of said oven and a single heating element in the lower portion of said oven having a heat generating capacity to maintain a desired baking temperature in said oven, the combined capacities of any two of said heating elements substantially equaling the total energy load of said oven imposed on said electrical supply source and switching means for connecting simultaneously one of said upper and said lower of said elements to said supply source in order to rapidly pre-heat said oven, for connecting said lower element only to said supply source for maintaining a baking temperature in said oven and for connecting both of said upper elements simultaneously to said supply source while said lower element is deenergized, to maintain a broiling temperature in the upper portion of said oven, the said switching means thereby connecting said heating elements to said supply source for preheating, baking and broiling so that the total energy load of said oven is never greater than the combined capacities of any two of said heating elements.

2. In an electrically heated oven, an electrical supply source for said oven, a heating element in the lower portion of said oven having a heat generating capacity to maintain a desired baking temperature in said oven, a second heating element in the upper portion of said oven having a heat generating capacity substantially equal to the heat generating capacity of said first heating element and when connected in parallel with it, said elements together will preheat said oven rapidly to its baking temperature, a third heating element in said upper portion having a heat generating capacity substantially equal to the heat generating capacity of each of said first and second elements and such that when connected in parallel with said second heating element, the two heating elements together will maintain a desired broiling temperature in the upper portion of said oven, the combined capacities of any two of said heating elements substantially equaling the total load of said oven imposed on said electrical supply source, switching means for said heating elements, and electrical connections between said heating elements, said switching means and said electrical supply source arranged by operation of said switching means to electrically connect the lower heating element with said second heating element in parallel to said supply source for rapidly preheating said oven, to connect said lower heating element alone to said supply source to maintain a baking temperature in said oven, and to connect said second and third heating elements in parallel to said supply source to provide a broiling temperature in said oven, the said switching means thereby connecting said heating elements to said supply source for preheating, baking and broiling so that the total energy load of said oven is never greater than the combined capacities of two of said heating elements.

3. In an electrically heated oven, a source of electrical supply for said oven, a heating element in the lower portion of said oven having a heat generating capacity sufficient to maintain a baking temperature in said oven, second and third heating elements each having substantially the same heat generating capacity as said first heating element located in the upper portion of said oven, the combined heat generating capacity of said second and third elements being sufficient to maintain a broiling temperature in the upper portion of said oven and the combined capacities of any two of said heating elements substantially equaling the total energy load of said oven imposed on said electrical supply source, and a single multi-position switch for controlling said heating elements arranged in one position to electrically connect only said lower and one of said upper elements in parallel to said supply source for rapidly preheating said oven, in another position to connect said lower element only to said supply source for maintaining a baking temperature in said oven and in still another position to connect only both of said two upper elements in parallel to said supply source for maintaining a broiling temperature in the upper portion of said oven.

HERMAN W. SCHULZE.